(12) United States Patent
Huang et al.

(10) Patent No.: US 8,433,040 B2
(45) Date of Patent: Apr. 30, 2013

(54) TELEPHONE SWITCHBOARD AND ELECTRONIC DEVICE FOR PROVIDING POWER TO LOAD HAVING DIFFERENT RESISTANCE VALUES AT DIFFERENT OPERATION MODES

(75) Inventors: Ren-Wen Huang, Guangdong (CN); Jun-Wei Zhang, Guangdong (CN); Tsung-Jen Chuang, New Taipei (TW); Shih-Fang Wong, New Taipei (TW)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 47 days.

(21) Appl. No.: 13/283,601

(22) Filed: Oct. 28, 2011

(65) Prior Publication Data

US 2013/0028395 A1      Jan. 31, 2013

(30) Foreign Application Priority Data

Jul. 29, 2011   (CN) .......................... 2011 1 0215852

(51) Int. Cl.
*H04M 3/22*    (2006.01)
*H04M 3/08*    (2006.01)
*H04M 1/24*    (2006.01)
*H04M 9/00*    (2006.01)
*H04M 1/00*    (2006.01)

(52) U.S. Cl.
USPC ... 379/20; 379/29.03; 379/29.04; 379/395.01

(58) Field of Classification Search ................. 379/1.01, 379/9.06, 20, 29.03, 29.04, 29.07, 30, 31, 379/32.01, 32.04, 387.01, 395.01, 399.01, 379/413, 413.01
See application file for complete search history.

(56) References Cited

U.S. PATENT DOCUMENTS

| | | | | |
|---|---|---|---|---|
| 4,473,719 A * | 9/1984 | Embree et al. | ................ | 379/382 |
| 5,323,461 A * | 6/1994 | Rosenbaum et al. | .... | 379/399.01 |
| 5,511,118 A * | 4/1996 | Gores et al. | ............. | 379/399.02 |
| 5,659,608 A * | 8/1997 | Stiefel | ...................... | 379/413.01 |
| 6,160,884 A * | 12/2000 | Davis | ....................... | 379/373.01 |
| 2003/0169871 A1* | 9/2003 | Enriquez et al. | ......... | 379/387.01 |
| 2003/0194083 A1* | 10/2003 | Scott et al. | .............. | 379/413.02 |
| 2003/0206626 A1* | 11/2003 | Scott et al. | .................... | 379/413 |
| 2006/0115076 A1* | 6/2006 | Enriquez et al. | ......... | 379/399.01 |
| 2006/0256395 A1* | 11/2006 | Ito | ................................ | 358/440 |

* cited by examiner

*Primary Examiner* — Binh Tieu
(74) *Attorney, Agent, or Firm* — Altis Law Group, Inc.

(57) ABSTRACT

A telephone switchboard provides various operating voltages to a telephone in different operation modes. The telephone switchboard includes a control unit, an output control circuit and a voltage converter. The control unit detects the operation mode of a telephone and generates control signals to the output control unit. The output control unit controls direction of current flowing through the telephone according to the control signal, and generates a feedback signal according to any change in the operation mode of the telephone. The voltage converter receives the feedback signal and converts the received power to a suitable output operation voltage according to the feedback signal. The telephone switchboard is capable of providing various operation voltages to the telephone in the different operation modes.

20 Claims, 4 Drawing Sheets

TELEPHONE SWITCHBOARD AND ELECTRONIC DEVICE FOR PROVIDING POWER TO LOAD HAVING DIFFERENT RESISTANCE VALUES AT DIFFERENT OPERATION MODES

BACKGROUND

1. Technical Field

The disclosure generally relates to an electronic device for providing power to a load that has different resistance values in different operation modes, and more particularly, to a telephone switchboard coupled between a network and a telephone.

2. Description of Related Art

Generally, a telephone has three operation modes including an on-hook state, a dialing state and a dialog state. In the on-hook state, the telephone is on standby and no calling signals are input to the telephone. In the dialing state, a calling signal is input to the telephone and the telephone is ringing. In the dialog state, users are able to transmit voice information to each other via the telephone. However, in these operation modes, the telephone has different operation resistance values. For example, when the telephone is in the on-hook state or in the dialing state, the telephone has an operation resistance value far greater than the resistance value when the telephone is in the dialog state. Therefore, a telephone switchboard is required to have an ability to generate different operation voltages relative to different modes of the telephone.

BRIEF DESCRIPTION OF THE DRAWINGS

The accompanying drawings are included to provide a further understanding of the disclosure. The drawings illustrate embodiments of the disclosure and, together with the description, serve to explain the principles of the disclosure.

DETAILED DESCRIPTION

Reference will be made to the drawings to describe certain exemplary embodiments of the present disclosure in detail.

In the present disclosure, the electronic device is capable of providing power voltages to at least one load. The at least one load has different resistance values at different operation modes. Accordingly, the electronic device is required to provide different voltages, i.e. different voltage values, to the load according to the current operation mode. In the following description, the telephone switchboard is configured to control dialog channels between a call-in telephone and a call-out telephone, and simultaneously, is configured to provide voltages to the call-in telephone. The call-in telephone includes an electronic connector for receiving the voltages. The electronic connector includes at least two voltage input terminals respectively as positive and negative phase voltage input terminals of the telephone for receiving the voltages.

In the embodiment, the telephone has three operation modes including an on-hook state, a dialing state and a dialog state. The resistance value of the telephone in an on-hook state or in a dialing state is greater than the resistance value of the telephone in a dialog state, therefore an operation voltage provided to the telephone in the on-hook or the dialing state is greater than the operation voltage supplied to the telephone when the telephone is in the dialog state. In the dialing state, although the operation voltage has a similar voltage value to that provided to the telephone when the telephone is in the on-hook state, the direction of current flowing through the telephone is periodically and alternately inverted. That is, the operation voltage has a square-wave signal waveform that continuously and periodically inverts between a positive level and a negative level.

Figure 1:
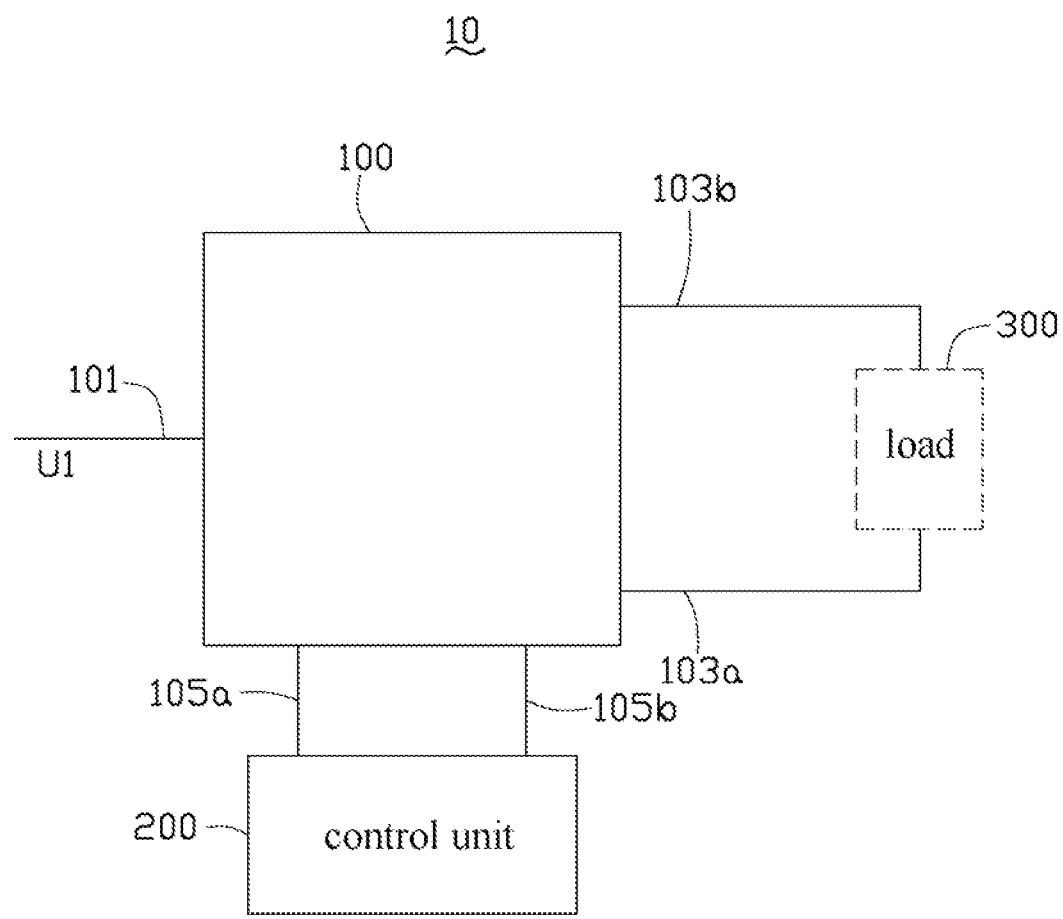
FIG. 1 is a block diagram of a telephone switchboard according to an exemplary embodiment of the present disclosure, the telephone switchboard including a power supply circuit.

Referring to FIG. 1, a block diagram of a telephone switchboard 10 according to an exemplary embodiment of the present disclosure is shown. The telephone switchboard 10 includes a power supply circuit 100 and at least one control unit 200. The telephone switchboard 10 is connected to at least one load 300 (i.e. the telephone). The control unit 200 is configured to detect the operation mode in which the load 300 is working and generate control signals accordingly to the power supply circuit 100. The power supply circuit 100 provides different operation voltages to the load 300 according to the received control signals.

The power supply circuit 100 includes a voltage input terminal 101, a first control terminal 105$a$, a second control terminal 105$b$, a first output terminal 103$a$ and a second output terminal 103$b$. The voltage input terminal 101 receives an original voltage U1 (i.e. a low direct current voltage) generated from an external circuit (not shown). The first and second control terminals 105$a$, 105$b$ are connected to the control unit 200 for receiving the control signals that indicate the operation mode of the load 300. In the embodiment, when the control unit 200 detects that the load 300 is in the on-hook state, the control unit 200 generates a high level signal (i.e. a logical 1 or a positive DC voltage) to the first control terminal 105$a$, and a low level signal (i.e. a logical 0 or a negative DC voltage) to the second control terminal 105$b$. Both of the high level signal and the low level signal serve as the control signals when the load 300 is working on the on-hook state. When the control unit 200 detects a change of state of the load 300 from the on-hook state to the dialing state, the control unit 200 generates a first driving signal and a second driving signal as the control signals to the first and second control terminals 105$a$, 105$b$, respectively. The first and second driving signals can be, for example, a binary digital signal or an alternating voltage signal. When the first and second driving signals are the binary digital signals, each bit in the first driving signal has a different value from a corresponding bit in the second driving signal. For example, when the first driving signal is 01010101, the second driving signal is 10101010. When the first and second driving signals are alternating voltage signals, the polarity of the first driving signal is inverted to that of the second driving signal. When the control unit 200 detects that the load 300 is in the dialog state, the control unit 200 outputs the low level signal and the high level signal as the control signals to the first controlling terminal 105$a$ and the second controlling terminal 105$b$, respectively. The two output terminals 103$a$, 103$b$ are connected to an interface circuit (not shown) of the load 300, so that the power supply circuit 100 supplies the voltages to drive the load 300 via the interface circuit.

Figure 2:
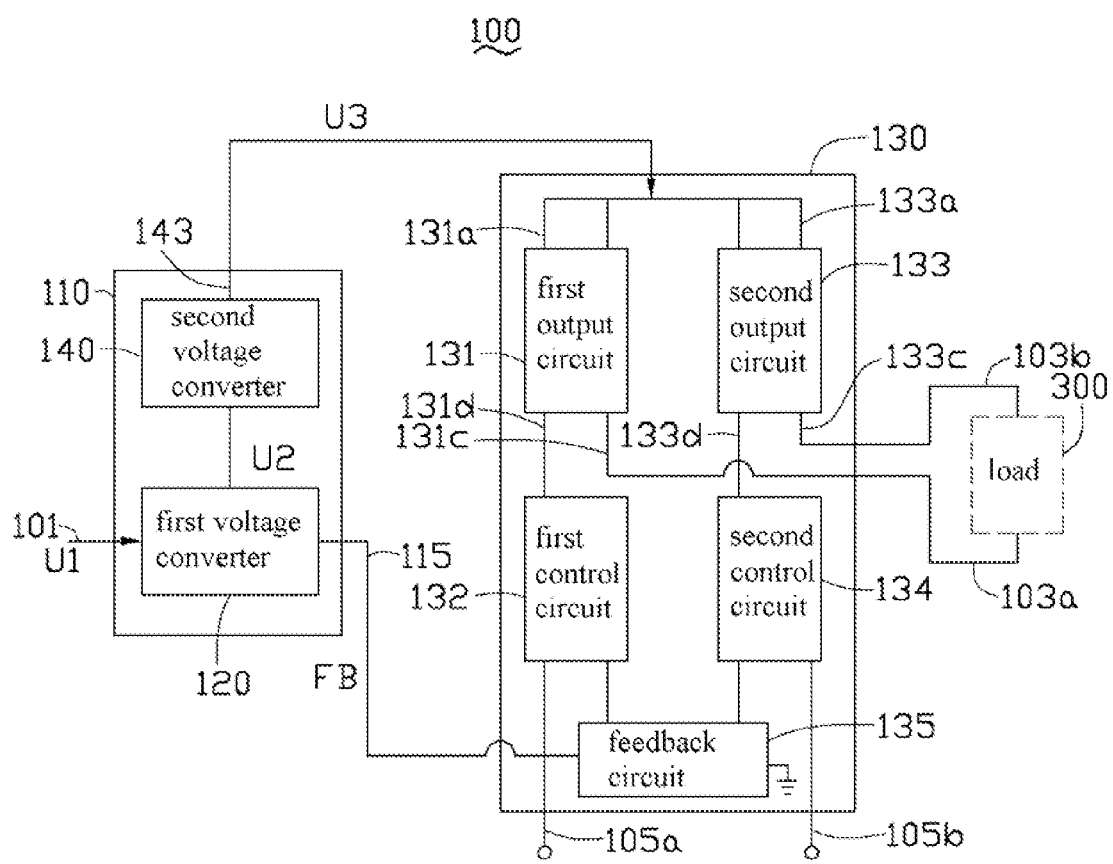
FIG. 2 is a block diagram of the power supply circuit of FIG. 1, the power supply circuit including a voltage converter and an output control circuit.

Referring to FIG. 2, a block diagram of an exemplary embodiment of the power supply circuit 100 is shown. The power supply circuit 100 includes a voltage converter 110 and an output control unit 130. The voltage converter 110 receives the original voltage U1, and includes a feedback terminal 115 for receiving a feedback signal FB that indicates a current value of the load 300, so that the voltage converter 110 converts the original voltage U1 to the correct voltage for the current mode of operation (output operation voltage U3). In the embodiment, the feedback signal FB can be, for example, a current feedback signal output from the output control unit 130. More details are described as follows.

Figure 3:
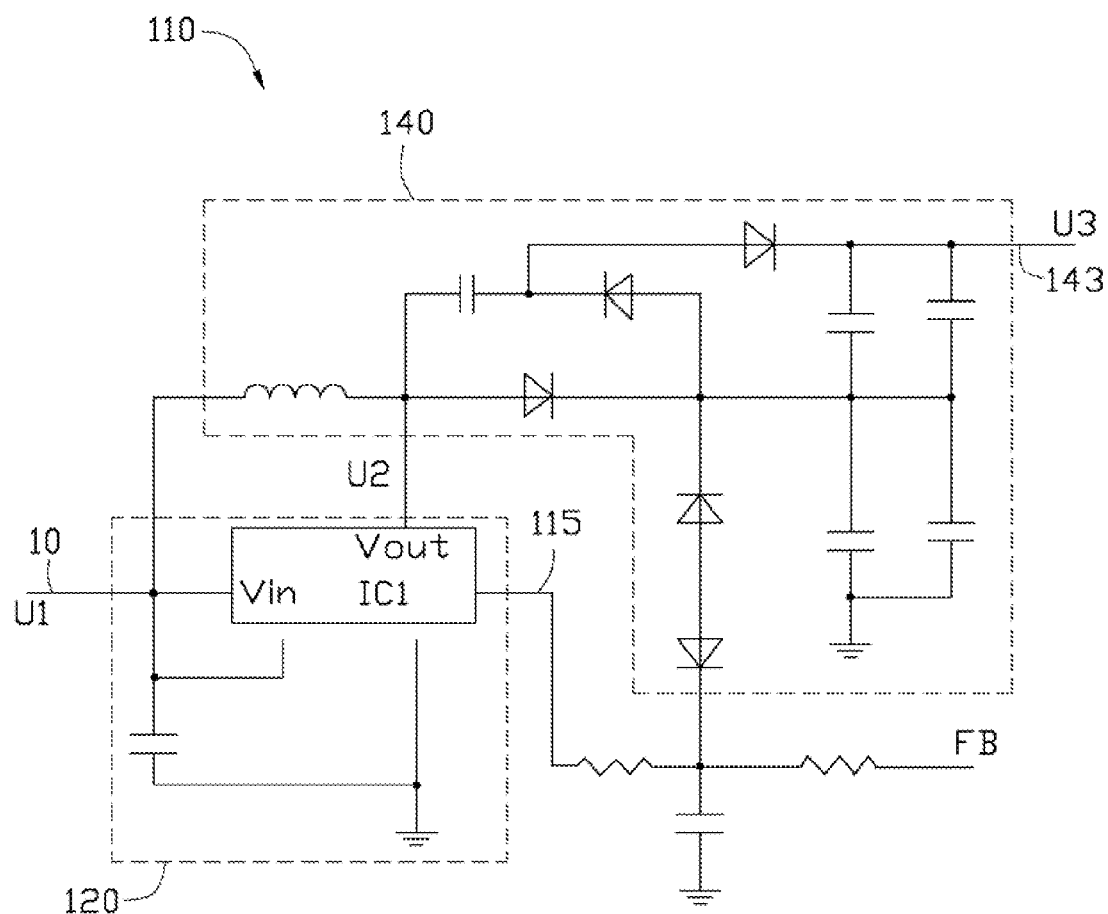
FIG. 3 is a circuit diagram illustrating an exemplary embodiment of the voltage converter of FIG. 2.

The voltage converter 110 can be, for example, a DC to DC voltage converter, and preferably a boosting circuit. In the embodiment, the voltage converter 110 may include a first voltage converter 120 and a second voltage converter 140. The first voltage converter 120 is configured to boost the original operation voltage U1, thereby generating a primary operation voltage U2. The second voltage converter 140 receives the primary operation voltage U2 and converts the voltage U2 to the output operation voltage U3. Referring also to FIG. 3, the first voltage converter 120 can preferably be for example a boosting integrated circuit IC1. The boosting integrated circuit IC1 includes at least one of a current feedback pin, a voltage feedback pin as the feedback terminal 115 of the voltage converter 110, an output terminal Vout for outputting the output operation voltage U3, and a voltage input terminal Vin connected to the voltage input terminal 101 for receiving the original voltage U1. The second voltage converter 140 can be for example a voltage doubling circuit or a voltage pump formed by a plurality of discrete components, such as inductors, diodes and capacitors. An output terminal 143 of the second voltage converter 140 is configured to output the output operation voltage U3.

The output control circuit 130 receives the output operation voltage U3 and controls polarities of the output operation voltage U3, such as a positive operation voltage or a negative operation voltage, that is applied to the load 300. That is, the output control circuit 130 controls the direction of current flowing through the load 300. The output control circuit 130 includes a first output circuit 131, a second output circuit 133, a first control circuit 132, and a second control circuit 134. The first output circuit 131 includes a first input terminal 131a connected to the voltage converter 110 for receiving the output operation voltage U3, a first voltage output terminal 131c connected to the first output terminal 103a, and a driving terminal 131d connected to the first control circuit 132. The first control circuit 132 is connected to the first control terminal 105a for receiving the control signals and determining whether the output operation voltage U3 should be output to the load 300 via the first output circuit 131 according to the received control signals. The second output circuit 133 includes a second input terminal 133a connected to the voltage converter 110 for receiving the output operation voltage U3, a second voltage output terminal 133c connected to the second output terminal 103b, and a second driving terminal 133d connected to the second control circuit 134. The second control circuit 134 is connected to the second control terminal 105b for receiving the control signals and determining whether the output operation voltage U3 is being output to the load 300 via the second output circuit 133, according to the received control signals. The first control circuit 132 and the second control circuit 134 are grounded via a feedback circuit 135. The feedback circuit 135 feeds the current flowing through the load 300 as a current feedback signal to the feedback terminal 115 of the voltage converter 110. The current feedback signal denotes the current flowing through the load 300. The voltage converter 110 detects the current value of the current on the current feedback signal and regulates the voltage value of the output operation voltage U3.

When the load 300 is in the on-hook state, the first control circuit 132 receives the high level signal and the second control circuit 134 receives the low level signal, and they control the output operation voltage U3 being output to the second output terminal 103b of the load 300 via the second output circuit 133. The current flowing through the load 300 flows through the first output terminal 103a, the first control circuit 132 and the feedback circuit 135 to ground, in that order. Therefore, in the on-hook state, the second output terminal 103b is regarded as a positive phase input terminal of the operation voltage U3, and the first output terminal 103a is regarded as a negative phase input terminal of the operation voltage U3. Accordingly, the feedback circuit 135 feeds the current as the current feedback signal back to the feedback terminal 115.

When the load 300 is in the dialing state, the first controlling terminal 105a and the second controlling terminal 105b receive the first driving signal and the second driving signal, respectively, so that the output operation voltage U3 is alternately applied to the first output terminal 103a and the second output terminal 103b. The load 300 is provided with a voltage having a waveform like an alternating voltage. Since the load 300 has similar resistance values in the on-hook state and in the dialing state, the values of the feedback signals as to the amount of current, which are fed back to the feedback terminal 115, are substantially similar, thereby the output operation voltage U3 substantially maintains the first current value.

When the load 300 enters the dialog state, the first control circuit 132 and the second control circuit 134 receive the low level signal and the high level signal respectively, thereby controlling the output operation voltage U3 which is output to the first output terminal 103a of the load 300 via the first output circuit 133. The current flowing through the load 300 passes through (in this order) the second output terminal 103b, the second control circuit 134 and the feedback circuit 135 to ground. Therefore, in the dialog state, the first output terminal 103a is regarded as the positive phase input terminal of the operation voltage U3, and the second output terminal 103b is regarded as the negative phase input terminal of the operation voltage U3. Accordingly, the feedback circuit 135 feeds the current flowing through the load 300 as the current feedback signal back to the feedback terminal 115. After entering the dialog stage, the resistance value of the load 300 decreases sharply, and the current flowing through the load 300 is larger than the current when the load 300 is both in the on-hook and dialing states. Therefore, the current with a larger value as the current feedback signal is fed back to the feedback terminal 115. The voltage converter 110 detects the change of current and then regulates or decreases the first voltage value of the output operation voltage U3 according to the current-level feedback signal.

Figure 4:
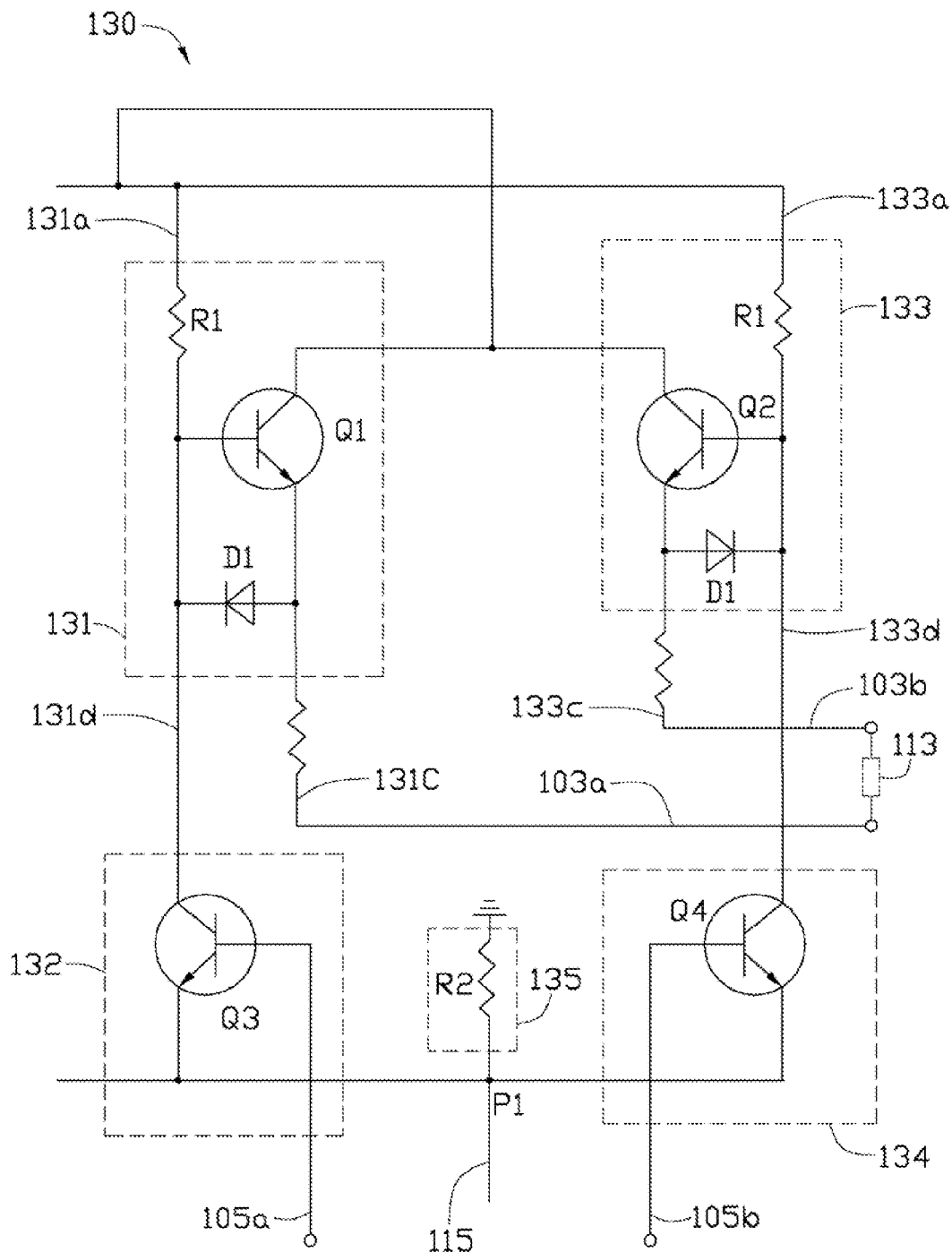
FIG. 4 is a circuit diagram illustrating an exemplary embodiment of the output control circuit of FIG. 2.

Referring to FIG. 4, a circuit diagram of the output control circuit 130 according to an exemplary embodiment of the present disclosure is shown. The first output circuit 131 includes a first switch element Q1, a diode D1 and a resistor R1. Gate electrode, Source electrode and drain electrode of the first switch element Q1 are connected to the first driving terminal 131d, the first input terminal 131a, and the first voltage output terminal 131c, respectively. Anode and cathode of the diode D1 are connected to the drain electrode and the gate electrode of the first switch element Q1, respectively. The resistor R1 is connected between the gate electrode and the source electrode of each element Q1. The second output circuit 133 has a circuit structure similar to the first output circuit 131, and includes a second switch element Q2 has a same transistor configuration as the first switch element Q1.

The first control circuit 132 has a circuit structure similar to the second control circuit 134. The first and the second control circuits 132, 134 include a third switch element Q3 and a fourth switch element Q4. The gate electrodes of the third and fourth switch elements Q2 serve as the first and second control terminals 105a, 105b. Source electrodes of the third and fourth switch elements are connected to the first and second driving terminals 131d, 133d, respectively, and drain electrodes are interconnected at a node P1. The feedback circuit 135 includes a sampling resistor R2 connected between the node P1 and ground. The node P1 is connected to the feedback terminal 115 of the voltage converter 110. The resistance value of the sampling resistor R2 is far less than that of the resistor R1. For example. The ratio of the resistance values between the sampling resistor R2 and the resistor R1 ranges from 1:130 to 1:200. Preferably, when the resistance value of the resistor R1 is 10 KΩ, the sampling resistor R2 is 75Ω.

Referring through FIG. 1 to FIG. 4, the detailed operation of the telephone switchboard 10 is described as follows:

In the beginning, the load 300 is in the on-hook state, the voltage converter 110 converts the original operation voltage U1 and outputs the output operation voltage U3 at a first voltage level. During the on-hook state, the control unit 200 generates the high level signal to the first control terminal 105a and the low level signal to the second control terminal 105b. The third switching element Q3 is switched on. At this time, the first switching element Q1 is switched off because the dividing voltage applied to the sampling resistor R2 is too small to switch on the first switching element Q1. Simultaneously, the fourth switching element Q4 is switched off, and accordingly the second switching element Q2 is switched on. The output operation voltage U3 is applied to the load 300 via the second output terminal 103b and the current flowing through the load 300 further flows through the first output terminal 103a, the diode D1 of the first output circuit 131, the third switching element Q3, the sampling resistor R2 and the feedback circuit 135. The current as the current feedback signal FB is fed back to the feedback terminal 115 of the voltage converter 110. The voltage converter 110 detects the change of current value of the current feedback signal FB and maintains the output operation voltage U3 at the first voltage value.

When the load 300 changes to the dialing state from the on-hook state, the control unit 200 generates the first driving signal and the second driving signal to the first control terminal 105a and the second control terminal 105b. The third and fourth switching elements Q3, Q4 are alternately switched on at the same interval. Accordingly, the first and second switching elements Q1, Q2 become switched-on in turn. Therefore, the first output terminal 103a and the second output terminal 103b alternate in serving as the positive input terminal for receiving the output operation voltage U3. During the dialing state, the level of the current flowing through the load 300 is maintained due to the resistance value of the load 300 being similar to that of the load 300 in the on-hook state. The current feedback signal FB experiences no change or changes only slightly, thereby controlling the voltage converter 110 to maintain the output operation voltage U3 at the first voltage value during the dialing period.

When entering the dialog state, the control unit 200 generates the low level signal to the first control terminal 105a and the high level signal to the second control terminal 105b. The fourth switching element Q4 is switched on and the third switching element Q3 is switched off, so that the second switching element Q2 is switched off and the first switching element Q1 is switched on. The output operation voltage U3 is applied to the load 300 via the first output terminal 103a and the current flowing through the load 300 further flows through the second output terminal 103b, the diode D1 of the second output circuit 133, the switched-on second switching element Q2, the sampling resistor R2 and the feedback circuit 135. Since the resistance value of the load 300 decreases sharply in the dialog state, the quantity of current indicated by the current feedback signal FB is larger than the feedback currents in the on-hook and the dialing states. The voltage converter 110 regulates the voltage value of the output operation voltage U3, thereby causing a proper second voltage value smaller than the first voltage value in the operation voltage U3.

In the telephone switchboard, the output control circuit 130 is capable of generating different control signals according to the operation modes of the load 300 to the voltage converter 110, and the voltage converter 110 regulates the voltage value of the output operation voltage U3. Therefore, the telephone switchboard can adapt to the change of the resistance value of the load 300 (e.g. a telephone). In addition, because the output control circuit 130 is capable of directly sourcing the current flowing through the load 300 as the feedback signal FB back to the voltage converter 110, even if the load 300 has an additional resistance value except for the resistance values on the above-mentioned operation modes, the voltage converter 110 is still capable of changing the voltage value of the output operation voltage U3 according to a change in the current value. Furthermore, the voltage converter 110 can be formed by an integrated circuit plus discrete components, such as resistors, diodes and capacitors, and the output control circuit 130 is formed by a few simple discrete components. In such a case, the telephone switchboard requires a smaller space than a typical telephone switchboard utilizing a transformer to arrange the power system 10, and therefore, the telephone switchboard has a smaller size.

Alternatively, the feedback signal FB also can be a voltage feedback signal obtained by sampling the signal levels of the control signal on one of the first and second control terminals 105a, 105b of the power supply 100 at predetermined intervals. In such a case, when the load 300 is in the on-hook state or in the dialing state, the signal levels of the control signal sampled from the first control terminal 105a are always maintained at a high level, or oscillate continuously between a high level and a low level at a predetermined frequency. Then, the voltage converter 110 converts the original operation voltage U1 to the output operation voltage U3 having a voltage value corresponding to the load 300 in the dialing or on-hook state. When the signal levels of the control signal require in a predetermined period that a low level is maintained, that is the load 300 is in the dialog state, the voltage converter 110 converts the original operation voltage U1 to the output operation voltage U3 suitable for the load 300 in the dialog state.

Although numerous characteristics and advantages of the present embodiments have been set out in the foregoing description, together with details of the structures and functions of the embodiments, the disclosure is illustrative only; and changes may be made in detail, especially in the matters of shape, size and arrangement of parts within the principles of the disclosure to the full extent indicated by the broad general meaning of the terms in which the appended claims are expressed.

What is claimed is:

1. A telephone switchboard for at least one telephone, comprising:

a control unit detecting a working operation mode of the at least one telephone and generating control signals that correspond to the working operation mode of the at least one telephone;

an output control circuit receiving the control signals, controlling direction of current flowing through the at least one telephone according to the received control signals, and generating a feedback signal according to change of the working operation mode of the at least one telephone; and a voltage converter receiving an original voltage generated by an external circuit, the voltage converter including a feedback terminal for receiving the feedback signal generated from the output control circuit, the voltage converter converting the original voltage into a corresponding output operation voltage according to the feedback signal, and outputting the corresponding output operation voltage to the at least one telephone.

2. The telephone switchboard of claim 1, further comprising a first control terminal and a second control terminal connected to the control unit for receiving the control signals, wherein the control unit generates two control signals at each working operation mode, the first control terminal receives one of the two control signals, and the second control terminal receives the other of the two control signals.

3. The telephone switchboard of claim 2, wherein the output control circuit includes a first output circuit, a second output circuit, a first control circuit and a second control circuit, the first output circuit and the second output circuit receive the output operation voltage and are connected to two voltage input terminals of the at least one telephone, the first control circuit receives the control signals applied on the first control terminal and determines whether the output operation voltage is applied to the at least one telephone via the first output circuit according to the received control signal, the second control circuit receives the control signal applied on the second control terminal and determines whether the output operation voltage is applied to the at least one telephone via the second output circuit according to the received control signal.

4. The telephone switchboard of claim 3, wherein the first output circuit includes a first input terminal connected to the voltage converter for receiving the output operation voltage, a first voltage output terminal connected to one of the two voltage input terminals of the at least one telephone, and a driving terminal connected to the first control circuit, and the second output circuit includes a second input terminal connected to the voltage converter for receiving the output operation voltage, a second voltage output terminal connected to the other of the two voltage input terminals of the at least one telephone, and a driving terminal connected to the second control circuit.

5. The telephone switchboard of claim 4, wherein each of the first and second output circuits comprises a first switching element, a diode and a resistor, a gate electrode of the first switching element serves as the driving terminal of a corresponding one of the first and second output circuits, a drain electrode of the first switching element is connected to a corresponding one of the two voltage input terminals of the at least one telephone, a source electrode of the first witching element is connected to the voltage converter, an anode of the diode is connected to the drain electrode of a corresponding first switching element, a cathode of the diode is connected to the gate electrodes of the corresponding first switching element, and the resistor is connected between the gate electrode and the source electrode of the corresponding one of the first switching element.

6. The telephone switchboard of claim 5, wherein each of the first and second control circuits comprises a second switching element, a gate electrode of the second switching element is connected to a corresponding one of the first and second control terminals, a drain electrode of the second switching element is connected to ground, and a source electrode of the second switching element is connected the driving terminal of a corresponding one of the first and second output circuits.

7. The telephone switchboard of claim 3, wherein the first and second control circuits are connected to a node, the output control circuit further comprises a feedback circuit connected between the node and ground and configured to feed the current flowing through the at least one telephone back to the feedback terminal, and the voltage converter changes a voltage value of the output operation voltage according to a current value of the current on the feedback terminal.

8. The telephone switchboard of claim 7, wherein the feedback circuit includes a sampling resistor connected between the node and ground, the node is connected to the feedback terminal.

9. The telephone switchboard of claim 3, wherein the feedback terminal is connected to one of the first and second control terminals, and the voltage converter samples signal levels of the control signal on the feedback terminal at intervals with a predetermined period.

10. The telephone switchboard of claim 1, wherein the voltage converter comprises a first voltage converter for boosting the power voltage to generate a primary operation voltage, and a second voltage converter for converting the primary operation voltage to the output operation voltage.

11. The telephone switchboard of claim 10, wherein the first voltage converter is a boosting integrated circuit comprising at least one of a current feedback pin and a voltage feedback pin as the feedback terminal of the voltage converter, and the first voltage converter changes a voltage value of the primary operation voltage according to the feedback signal.

12. An electronic device connected to at least one load, comprising:

a control unit detecting a working operation mode of the at least one load and generating control signals that correspond to the working operation mode of the at least one load; and a power supply system configured for providing operation voltages to the at least one load, the power supply system comprising:

a voltage input terminal for receiving an original voltage generated by an external circuit;

first and second control terminals connected to the control unit for receiving the control signals;

first and second output terminals connected to two voltage input terminals of the at least one load for providing a corresponding operation voltage to the at least one load;

an output control circuit connected to the first and second control terminals for receiving the control signals, and configured for generating a feedback signal according to change of the operation mode of the at least one load; and a voltage converter connected to the voltage input terminal and comprising a feedback terminal for receiving the feedback signal generated by the output control circuit, wherein the voltage converter converts the original voltage into a corresponding operation voltage according to the feedback signal, and outputs the corresponding operation voltage to the at least one load, and the output control circuit receives the corresponding operation voltage and controls direction that the corresponding operation voltage is applied to the at least one load according to the received control signals.

13. The electronic device of claim 12, wherein the output control circuit includes a first output circuit, a second output circuit, a first control circuit and a second control circuit, the first output circuit and the second output circuit are connected to the first and second output terminals, respectively, the first control circuit receives the control signals applied on the first control terminal and determines whether the corresponding operation voltage is applied to the at least one load via the first output circuit according to the received control signals, the second control circuit receives the control signal applied on the second control terminal and determines whether the corresponding operation voltage is applied to the at least one load via the second output circuit according to the received control signals.

14. The electronic device of claim 13, wherein the first output circuit includes a first input terminal connected to the voltage input terminal, a first voltage output terminal connected to one of the first and second output terminals, and a driving terminal connected to the first control circuit, and the second output circuit includes a second input terminal connected to the voltage input terminal, a second voltage output terminal connected to the other of the first and second output terminals, and a driving terminal connected to the second control circuit.

15. The electronic device of claim 14, wherein each of the first and second output circuits comprises a first switching element, a diode and a resistor, a gate electrode of the first switching element serves as the driving terminal of a corresponding one of the first and second output circuit, a drain electrode of the first switching element is connected to a corresponding one of the first and second output terminals, a source electrode of the first witching element is connected to the voltage input terminal, an anode of the diode is connected to the drain electrode of a corresponding first switching element, a cathode of the diode is connected to the gate electrode of the corresponding first switching element, and the resistor is connected between the gate electrode and source electrode of the corresponding first switching element.

16. The electronic device of claim 15, wherein each of the first and second control circuits comprise a second switching element, a gate electrode of the second switching element is connected to a corresponding one of the first and second control terminals, a drain electrode of the second switching element is connected to ground, and a source electrode of the second switching element is connected the driving terminal of a corresponding one of the first and second output circuits.

17. The electronic device of claim 13, wherein the first and second control circuits are connected to a node, the output control circuit further comprises a feedback circuit connected between the node and ground and configured to feed the current flowing through the at least one load back to the feedback terminal, and the voltage converter changes a voltage value of the output operation voltage according to a current value of the current flowing through the feedback terminal.

18. The electronic device of claim 13, wherein the feedback terminal is connected to one of the first and second control terminals, and the voltage converter samples signal levels of the control signal on the feedback terminal at intervals with a predetermined period.

19. The electronic device of claim 13, wherein the voltage converter comprises a first voltage converter for boosting the power voltage to generate a primary operation voltage, and a second voltage converter for converting the primary operation voltage to the output operation voltage.

20. The electronic device of claim 19, wherein the first voltage converter is a boosting integrated circuit comprising at least one of a current feedback pin and a voltage feedback pin as the feedback terminal of the voltage converter, and the first voltage converter changes a voltage value of the primary operation voltage according to the feedback signal.

* * * * *